United States Patent
MacKinnon

(10) Patent No.: US 6,828,386 B2
(45) Date of Patent: Dec. 7, 2004

(54) PROCESS FOR PREPARING GRAFT COPOLYMERS AND MEMBRANES FORMED THEREFROM

(75) Inventor: Sean M. MacKinnon, Burnaby (CA)

(73) Assignee: Ballard Power Systems Inc., Burnaby (CA)

( * ) Notice: Subject to any disclaimer, the term of this patent is extended or adjusted under 35 U.S.C. 154(b) by 0 days.

(21) Appl. No.: 10/251,644

(22) Filed: Sep. 20, 2002

(65) Prior Publication Data

US 2004/0059015 A1 Mar. 25, 2004

(51) Int. Cl.[7] .......................... C08F 2/46; C08F 291/18; C08J 5/20; C08J 3/28
(52) U.S. Cl. ................ 525/276; 525/243; 525/246; 525/326.2; 522/85; 522/106; 522/124; 522/125; 522/134
(58) Field of Search ................ 525/276, 243, 525/246, 326.2; 522/85, 106, 124, 125, 134

(56) References Cited

U.S. PATENT DOCUMENTS

| | | | |
|---|---|---|---|
| 4,012,303 A | 3/1977 | D'Agostino et al. ... | 204/159.17 |
| 4,107,005 A | 8/1978 | D'Agostino et al. .......... | 204/98 |
| 4,339,473 A | 7/1982 | D'Agostino et al. .......... | 427/44 |
| 4,605,685 A | 8/1986 | Momose et al. ............ | 522/124 |
| 4,864,006 A | 9/1989 | Giannetti et al. ........... | 526/209 |
| 4,990,283 A | 2/1991 | Visca et al. .................. | 252/309 |
| 5,198,493 A | 3/1993 | Holmberg et al. .......... | 525/54.1 |
| 5,384,941 A | 1/1995 | Welser ........................ | 204/129 |
| 5,428,122 A | 6/1995 | Abusleme et al. ........... | 526/209 |
| 5,656,386 A | 8/1997 | Scherer et al. ................ | 429/33 |
| 5,994,426 A | 11/1999 | Nezu et al. .................. | 522/125 |
| 6,103,843 A | 8/2000 | Abusleme et al. .......... | 526/209 |
| 6,225,368 B1 | 5/2001 | D'Agostino et al. .......... | 522/79 |
| 6,359,019 B1 | 3/2002 | Stone et al. .................. | 521/27 |
| 6,387,964 B1 * | 5/2002 | D'Agostino et al. .......... | 521/27 |
| 2002/0013439 A1 | 1/2002 | Apostolo et al. ............. | 526/243 |
| 2002/0035178 A1 | 3/2002 | Abusleme et al. .......... | 524/165 |

FOREIGN PATENT DOCUMENTS

| | | |
|---|---|---|
| EP | 0 526 203 B1 | 6/1995 |
| EP | 0 913 422 A2 | 5/1999 |
| JP | 8-157504 | 6/1996 |
| WO | WO 99/24497 | 5/1999 |
| WO | WO 01/58576 A1 | 8/2001 |
| WO | WO 02/36648 A1 | 5/2002 |
| WO | WO 03/018655 A1 | 3/2003 |

* cited by examiner

Primary Examiner—Sam A. Acquah
Assistant Examiner—Olga Asinovsky
(74) Attorney, Agent, or Firm—Seed IP Law Group PLLC

(57) ABSTRACT

A process for preparing a graft copolymers is provided comprising exposing a polymeric base material to a dose of ionizing radiation, and then contacting the irradiated base material with a microemulsion comprising at least one fluorostyrenic monomer, water and water-miscible solvent. The graft copolymer may be formed into a membrane, including ion exchange membranes.

45 Claims, No Drawings

PROCESS FOR PREPARING GRAFT COPOLYMERS AND MEMBRANES FORMED THEREFROM

BACKGROUND OF THE INVENTION

1. Field of the Invention

The present invention relates to processes for preparing graft copolymers by radiation induced graft polymerization of fluorostyrenic monomers, employing monomer microemulsions. The graft copolymers may be formed into membranes, including ion exchange membranes.

2. Description of the Related Art

The preparation of graft polymeric membranes by radiation induced graft polymerization of a monomer to a polymeric base film has been demonstrated for various combinations of monomers and base films. The grafting of styrene to a polymeric base film, and subsequent sulfonation of the grafted polystyrene chains has been used to prepare ion-exchange membranes.

U.S. Pat. No. 4,012,303 reports the radiation induced graft polymerization of $\alpha,\beta,\beta$-trifluorostyrene (TFS) to dense polymeric base films using gamma ray co-irradiation. The graft polymerization procedure may use TFS in bulk or in solution. The '303 patent reports that aromatic compounds or halogenated compounds are suitable solvents.

U.S. Pat. No. 4,605,685 reports the graft polymerization of TFS to pre-irradiated polymeric base films. Dense polymeric base films, such as for example polyethylene and polytetrafluoroethylene, are pre-irradiated and then contacted with TFS neat or dissolved in a solvent. The '685 patent also states that the base films may have fine pores.

U.S. Pat. No. 6,225,368 reports graft polymerization of unsaturated monomers to pre-irradiated polymeric base films employing an emulsion including the monomer, and emulsifier and water. In the method of the '368 patent, a base polymer is activated by irradiation, quenched so as to affect cross-linking of the polymer, and then activated again by irradiation. The activated, cross-linked polymer is then contacted with the emulsion. Graft polymerization to dense polymeric base films is reported, although the '368 patent mentions that microporous base films may also be employed. The '368 patent also states that the use of the disclosed method eliminates homopolymerization caused by irradiation of the monomer, and that this allows the use of high concentrations of monomers in the emulsion.

These methods of preparing graft polymeric membranes have several disadvantages.

When neat TFS is employed in graft polymerization reactions, it can be difficult to achieve a contact time between the monomer and a dense irradiated base film resulting in the desired level of graft polymerization that would be suitable for high-volume production. Typically, the neat monomer does not wet the surface of the base film very effectively, and this can result in an undesirably low graft polymerization rate unless a prolonged contact time is employed. Further, the use of neat TFS may adversely increase the cost of the graft polymerization process, due to the excess of monomer that is required.

A disadvantage of graft polymerization reactions carried out using TFS solutions is the level of graft polymerization drops significantly as the concentration of monomer in the solution is lowered. Indeed, the '303 patent reports a significant decrease in percentage graft with decreasing TFS concentrations. The drop in percentage graft may be mitigated by increasing the radiation dosage and/or the grafting reaction temperature, but this necessarily increases the energy requirements of the graft polymerization process and may promote undesirable side reactions. Overall, the use of TFS in solution tends to undesirably increase the cost of the graft polymerization process.

BRIEF SUMMARY OF THE INVENTION

A process for preparing graft copolymers is provided. In one embodiment, the process comprises exposing a polymeric base material to a dose of ionizing radiation and contacting the irradiated base material with a microemulsion, where the microemulsion comprises at least one fluorostyrenic monomer, water, and a water-miscible solvent.

The polymeric base material may be in any suitable form, such as powder, resin, bead, pellet, fiber or film, for example. The polymeric base material may be dense or porous.

In other embodiments, the present process further comprises forming the graft copolymer into a membrane. In applications where porous base materials are employed, the present process may further comprise densifying the resulting graft copolymer membrane.

In further embodiments, the present process further comprises introducing ion exchange functionality into the graft copolymer and/or graft copolymer membrane.

DETAILED DESCRIPTION OF THE INVENTION

In the present process, a graft copolymer is prepared by exposing a polymeric base material to a dose of ionizing radiation, and then contacting the irradiated base material with a microemulsion comprising at least one fluorostyrenic monomer, water and a water-miscible solvent.

Any radiation capable of introducing sufficient concentrations of free radical sites on and within the polymeric base material may be used in the preparation of the graft copolymer membranes described herein. For example, the irradiation may be by gamma rays, X-rays, electron beam, high-energy UV radiation or combinations thereof. The base material may be irradiated in an inert atmosphere. The radiation dose to which the base material is exposed may vary from 1–100 Mrad. Typically, the dose range is between 20–60 Mrad.

The polymeric base material may be in any suitable form, such as powder or resin, or dense or porous (including microporous), beads, pellets, fibers or film, for example. Porous films include woven, nonwoven, foamed, expanded or perforated webs; hollow fibers are an example of a porous fiber.

Typically, the base material imparts mechanical strength to the graft copolymer and should be physically and chemically stable to irradiation and the conditions to which it is to be exposed in the end-use application of the graft copolymer. Suitable base materials include homopolymers or copolymers of non-fluorinated, fluorinated and perfluorinated vinyl monomers. Fluorinated and perfluorinated polymers may be desired for certain applications due to their enhanced oxidative and thermal stability. Suitable base materials include, but are not limited to, films comprising polyethylene, polypropylene, polyvinylidene fluoride, polytetrafluoroethylene, poly(ethylene-co-tetrafluoroethylene), poly(tetrafluoroethylene-co-perfluorovinylether), poly(tetrafluoroethylene-co-hexafluoropropylene), poly(vinylidene fluoride-cohexafluoropropylene), poly(vinylidene fluoride-co-chlorotrifluoroethylene), and poly(ethylene-co-chlorotrifluoroethylene).

The irradiated base material is then contacted with the microemulsion and monomer is then incorporated into the base material to form a graft copolymer. The irradiated base material may be contacted with the microemulsion in an inert atmosphere, if desired. The microemulsion may assist in wetting the irradiated base material with the monomer. In one embodiment, the base material comprises ultra-high molecular weight polyethylene.

Suitable fluorostyrenic monomers include α-fluorostyrenes, α,β-difluorostyrenes, α,β,β-trifluorostyrenes, and the corresponding fluoronaphthylenes. Unsubstituted and substituted monomers, particularly para-substituted monomers, may be employed. Mixtures of fluorostyrenic monomers may also be employed in the microemulsion, if desired. In one embodiment, the amount of monomer in the microemulsion is in the range of about 5% to about 30% by weight. In another embodiment, the amount of monomer in the microemulsion is less than or equal to 30% by weight. In still a further embodiment, the amount of monomer in the microemulsion is less than or equal to 10% by weight.

As used herein and in the appended claims, a substituted fluorostyrenic monomer refers to monomers having substituents on the aromatic ring. Suitable substituted α,β,β-trifluorostyrenes and α,β,β-trifluoronaphthylenes are described in PCT Application No. PCT/CA98/01041, and PCT Application No. PCT/CA00/00337. Examples of such α,β,β-trifluorostyrenes include, but are not limited to, methyl-α,β,β-trifluorostyrene, methoxy-α,β,β-trifluorostyrene, thiomethyl-α,β,β-trifluorostyrene, and phenyl-α,β,β-trifluorostyrene.

The microemulsion may further comprise other suitable non-fluorinated monomers, such as styrene, α-methylstyrene, and vinyl phosphonic acid, for example. Depending on the end-use application of the graft copolymer, the incorporation of a proportion of such non-fluorinated monomers may reduce cost without unduly affecting performance.

In the present context, a microemulsion refers to a thermodynamically stable dispersion of one liquid phase into another. The microemulsion is typically a clear solution, having a sub-micron particle size.

The microemulsion may be an aqueous system, i.e., a microemulsion comprising the monomer(s), water and a water-miscible solvent. In the present context, a suitable solvent for the microemulsion has the following characteristics:

1. the solvent dissolves or is miscible with the unsaturated vinyl monomer(s);
2. the solvent is at least partially miscible in water; and
3. the solvent is substantially unreactive towards graft polymerization under the polymerization conditions.

For example, low molecular weight alcohols can be suitable solvents, providing they are stable to free radicals. Alcohols that may be suitable solvents include $C_1$–$C_4$ alcohols, such as methanol, ethanol, 1-propanol, isopropanol and t-butanol. Substituted alcohols and polyhydroxyl alcohols can also be suitable solvents, provided they have the above characteristics. As another example, water-miscible ethers, such as diglyme, dioxane or tetrahydrofuran may also be suitable solvents. In another embodiment, the solvent comprises N-alkylpyrrolidone.

As a further example, the applicant has found that N-methylpyrrolidone (NMP) can be a suitable solvent in the microemulsion, despite the fact that NMP can adversely affect grafting rates when used in a monomer-solvent system. In other words, NMP may be substantially unreactive towards grafting polymerization under the polymerization conditions when employing a microemulsion according to the present process. It is anticipated that water-miscible ketones, in general, may be suitable solvents, provided the carbonyl partitions in the aqueous phase of the microemulsion.

Alternatively, a non-aqueous emulsion may be employed, comprising the monomer(s), a first liquid phase in which the monomer(s) are not soluble, and a second liquid phase that is at least partially miscible in the first liquid phase and dissolves or is miscible with the monomer(s). In this case, both the first and second liquid phases should be substantially unreactive towards graft polymerization under the polymerization conditions.

The microemulsion may further comprise an emulsifier. Ionic and nonionic emulsifiers may be employed. Non-limiting examples of suitable emulsifiers include sodium lauryl sulfate and dodecylamine hydrochloride. Depending upon the type and concentration of monomer(s) employed in the emulsion, an emulsifier may increase the stability of the microemulsion. The particular emulsifier, if it is employed, is not essential and persons skilled in the art can readily choose a suitable emulsifier for a given application.

If desired, the microemulsion may also comprise an inhibitor to limit the amount of dimerization and/or homopolymerization of the monomer(s) that may occur in the emulsion during graft polymerization. Again, the choice of inhibitor is not essential to the present process and suitable inhibitors will be apparent to persons skilled in the art.

The graft polymerization reaction may be carried out at any suitable temperature. Higher temperatures may result in higher graft polymerization rates, but can also increase the rate of dimerization/homopolymerization of the monomer. Suitable temperature ranges will depend on such factors as the desired level of grafting of the base material, the graft polymerization rate as a function of temperature for the monomer(s) employed, and the rate of dimerization/homopolymerization of the monomer(s) as a function of temperature. For example, temperatures in the range of 20–100° C. are suitable, with a range of 50–80° C. being typical when employing α,β,β-trifluorostyrenic monomers. Persons skilled in the art can readily determine suitable temperature ranges for a given application of the present process.

The method by which the irradiated base material is contacted with the microemulsion is not essential to the present process. For example, the irradiated base material may be immersed in a microemulsion bath, or the irradiated base material may be coated with the microemulsion. Alternatively, the microemulsion could be sprayed on, either as a microemulsion or as components that form the microemulsion in situ. As a further example, the microemulsion could be contacted with the irradiated base material as a mist. A combination of any of the foregoing methods may also be employed.

After graft polymerization, the graft copolymer may be washed in a suitable solvent. The choice of solvent is not essential to the present process. Generally, it should be a solvent for the monomer but not for the base material. Persons skilled in the art can readily determine suitable solvents for a particular application.

The present process may further comprise forming the graft copolymer into a membrane. The method of forming the graft copolymer into a membrane is not essential to the present process and will depend, in part, on the bulk properties of the polymeric base material and/or graft copolymer. Casting or extruding, for example, may be suitable for powders, resins and pellets. Fibers may be bundled, woven or formed into nonwoven webs. Persons skilled in the art can readily select an appropriate method of forming the graft copolymer into a membrane for a given application.

Ion exchange functionality may then be introduced (directly or indirectly) into the graft copolymer by subsequent reactions, such as, halomethylation, sulfonation, phosphonation, amination, carboxylation, hydroxylation and nitration, for example. More than one ion exchange moiety may be introduced into the graft copolymer, if desired. Sulfonation and/or phosphonation, in particular, may be employed where the graft copolymer is intended for incorporation into an ion exchange membrane for use in fuel cell applications.

The particular method of introducing ion exchange functionality into the graft copolymer is not essential to the present process, nor is the selection of the particular reagent. For example, where a sulfonated graft copolymer is desired, liquid or vapor phase sulfonation may be employed, using sulfonating agents such as sulfur trioxide, chlorosulfonic acid (neat or in solution), and oleum; with chlorosulfonic acid a subsequent hydrolysis step may be required. Where an ion exchange membrane is desired, ion exchange functionality may be introduced before or after the graft copolymer is formed into a membrane.

The graft copolymer may be presoaked with a solvent before sulfonation, if desired. The solvent should be compatible with the sulfonating agent and may contain acetic acid to reduce sulfone formation. The solvent may also swell the graft copolymer, thereby opening up its structure and facilitating access to the interior of the graft copolymer by the sulfonating agent. Suitable solvents include halogenated solvents such as 1,2-dichloroethane and 1,1,2,2-tetrachloroethane, for example.

Where a porous film is selected, the present process may further comprise densifying the resulting graft copolymer membrane to produce a substantially gas-impermeable membrane. For example, the graft copolymer membrane may be densified by impregnating it to substantially fill the porosity or by collapsing the porosity of the graft copolymer membrane. In the latter instance, the porosity may be collapsed by the application of pressure and heat. For example, the graft copolymer membrane could be heated to at least the melt flow temperature of the base material. In some applications, it may be desirable to select a base material having a lower melt flow temperature than the grafted side-chains. Alternatively, depending on the selection of monomer(s) and base material, it may be possible to collapse the porosity of the graft copolymer membrane by the application of pressure at ambient temperature. Other methods of densifying the graft copolymer membrane may also be employed, as will be apparent to persons skilled in the art.

Where an ion exchange membrane is desired, ion exchange functionality can be introduced into the graft copolymer membrane before or after densification.

The use of chlorosulfonic acid to generate an intermediate sulfonyl chloride functionality may facilitate the collapse of porosity in the graft copolymer membrane. The presence of the sulfonyl chloride functionality, and sulfonyl halides in general, tends to decrease the temperature at which irreversible collapse of the porous structure occurs, relative to a sulfonated membrane. Further, issues relating to the thermal stability of the sulfonic acid functionality, such as desulfonation, may be avoided by collapsing the porosity of the graft copolymer membrane in a sulfonyl halide form. In applications where relatively high temperatures are required to collapse the porosity, this approach may be desirable. As mentioned previously, ion exchange functionality can be introduced by subsequently hydrolyzing the sulfonyl halide to yield a sulfonated graft copolymer membrane.

Alternatively, the sulfonated graft copolymer membrane could be converted to a sulfonate salt form. Sulfonate salts are represented by the formula $SO_3^-M^+$, where $M^+$ may be any suitable counterion, such as, for example, metal cations and quaternary ammonium ions. The salt form of the membrane typically exhibits superior thermoplastic characteristics, and increased thermal stability, relative to the sulfonic acid form. Again, where relatively high temperatures are required to collapse the porosity of the graft copolymer membrane, this approach may also be desirable.

EXAMPLE 1

Dynamic Light Scattering Analysis

Dynamic light scattering analysis was performed to determine the average size of particles in various samples. The samples were as follows:

Sample 1: n-propanol (98%)
Sample 2: 10 wt % para-methyl-α,β,β-trifluorostyrene (p-Me-TFS) in n-propanol
Sample 3: 10 wt % para-methyl-α,β,β-trifluorostyrene (p-Me-TFS) in aqueous 1-propanol (60% n-propanol, 40% water, by volume)
Sample 4: 10 wt % para-methyl-α,β,β-trifluorostyrene (p-Me-TFS) in water with surfactant (0.065 g/ml sodium lauryl sulfate (SDS))

The samples (150 μl) were tested at 22° C. in a PD-Expert DLS Workstation (Precision Detectors, Franklin, Mass.). Samples 2–4 were tested in triplicate. Table 1 summarizes the results of the dynamic light scattering analysis.

TABLE 1

Dynamic Light Scattering Analysis Results

| Sample | Decay Curve | Particle Size | Comments |
|---|---|---|---|
| 1 | Unresolved (11,000 cnts/sec) | — | No particle size analysis possible - no measurable light scattering |
| 2 | Unresolved (12,000–41,000 cnts/sec) | — | No particle size analysis possible - no measurable light scattering |
| 3 | Well resolved (160,000 cnts/sec) | ~400 nm | The microemulsion appeared clear - no phase separation apparent. |
| 4 | Well resolved (3,000,000 cnts/sec) | 0.8–8 μm | The emulsion undergoes phase separation and contains a bimodal distribution of particle sizes |

As Table 1 shows, no measurable light scattering was observed in either Sample 1 or Sample 2. This is to be expected, as neither the 98% n-propanol nor the monomer solution (10 wt % p-Me-TFS in n-propanol) would be expected to contain particles. By contrast, the results for Sample 4 are generally consistent with an emulsion, exhibiting phase separation over time. The results for Sample 3 are consistent with a microemulsion; clear with no apparent phase separation, and exhibiting a sub-micron particle size.

EXAMPLE 2

Graft Polymerization of para-methyl-α,β,β-trifluorostyrene (p-Me-TFS) to poly(ethylene-co-chlorotrifluoroethylene) (Halar®) Film 5 cm×5 cm samples of poly(ethylene-co-chlorotrifluoroethylene) (Halar®) film were prepared from dense Halar® (25 μm thick) and Halar® MBF (porous film; 630 μm thick, 102 g/m²). The samples were irradiated with a dose of 20 Mrad using a 10 MeV ion beam radiation source, in an inert atmosphere with dry ice cooling.

Neat, degassed p-Me-TFS was added to de-gassed 1-propanol or 1-propanol/water mixtures to produce p-Me-TFS solutions and microemulsions. The composition of the various reaction media is given in Table 2. Media containing emulsifier contain sodium lauryl sulfate (SDS; 0.065 g/ml water).

Duplicate samples of the dense and porous Halar® were then immersed in the various reaction media at 60° C. for 2 hours, in an inert atmosphere. Control samples were also exposed to neat, degassed p-Me-TFS under the same conditions. The resulting p-Me-TFS grafted films were then washed twice with acetone and once with toluene before being dried at about 70° C. in a vacuum (3.9 kPa) for 3 hours. The percentage graft polymerization for each sample was then determined by calculating the percentage increase in mass of the grafted film relative to the mass of the base material.

The reaction conditions and percentage graft polymerization for each sample is summarized in Table 2.

TABLE 2

Graft polymerization of para-methyl-α,β,β-trifluorostyrene (p-Me-TFS) to poly(ethylene-co-chlorotrifluoroethylene) (Halar ®) Film

| Sample | Dense or Porous | Vol. 1-propanol (ml) | Vol. Water (ml) | Vol. p-Me-TFS (ml) | % Monomer | % Graft |
|---|---|---|---|---|---|---|
| Controls | | | | | | |
| 5 | Dense | — | — | 35.00 | 100 (neat) | 20.10 |
| 6 | Dense | — | — | 35.00 | 100 (neat) | 20.10 |
| 7 | porous | — | — | 35.00 | 100 (neat) | 25.20 |
| 8 | porous | — | — | 35.00 | 100 (neat) | 25.70 |
| Solution of p-Me-TFS in 1-propanol | | | | | | |
| 9 | Dense | 31.50 | — | 3.50 | 10 vol % | 1.20 |
| 10 | Dense | 31.50 | — | 3.50 | 10 vol % | 2.50 |
| 11 | porous | 31.50 | — | 3.50 | 10 vol % | 9.20 |
| 12 | porous | 31.50 | — | 3.50 | 10 vol % | 9.80 |
| 13 | Dense | 24.50 | — | 10.50 | 30 vol % | 12.2 |
| 14 | Dense | 24.50 | — | 10.50 | 30 vol % | 11.6 |
| 15 | porous | 24.50 | — | 10.50 | 30 vol % | 19.9 |
| 16 | porous | 24.50 | — | 10.50 | 30 vol % | 19.5 |
| Microemulsion of p-Me-TFS in 1-propanol/water | | | | | | |
| 17 | Dense | 19.50 | 12.80 | 2.70 | 10 wt % | 20.3 |
| 18 | Dense | 19.50 | 12.80 | 2.70 | 10 wt % | 20.6 |
| 19 | porous | 19.50 | 12.80 | 2.70 | 10 wt % | 28.4 |
| 20 | porous | 19.50 | 12.80 | 2.70 | 10 wt % | 28.7 |
| 21 | dense | 18.70 | 6.00 | 10.40 | 30 wt % | 19.9 |
| 22 | dense | 18.70 | 6.00 | 10.40 | 30 wt % | 19.7 |
| 23 | porous | 18.70 | 6.00 | 10.40 | 30 wt % | 30.0 |
| 24 | porous | 18.70 | 6.00 | 10.40 | 30 wt % | 29.9 |
| Microemulsion of p-Me-TFS in 1-propanol/water including emulsifier | | | | | | |
| 25 | dense | 18.00 | 14.40 | 2.60 | 10 wt % | 15.8 |
| 26 | dense | 18.00 | 14.40 | 2.60 | 10 wt % | 13.8 |
| 27 | porous | 18.00 | 14.40 | 2.60 | 10 wt % | 28.4 |
| 28 | porous | 18.00 | 14.40 | 2.60 | 10 wt % | 27.2 |
| 29 | dense | 20.00 | 7.00 | 8.00 | 30 wt % | 17.6 |
| 30 | dense | 20.00 | 7.00 | 8.00 | 30 wt % | 17.9 |
| 31 | porous | 20.00 | 7.00 | 8.00 | 30 wt % | 26.2 |
| 32 | porous | 20.00 | 7.00 | 8.00 | 30 wt % | 26.0 |

As shown in Table 2, the 10 wt % microemulsion samples exhibited a level of grafting comparable to the neat p-Me-TFS samples. Also note that the addition of emulsifier to the microemulsion did not increase the grafting yield, which suggests that stability of the microemulsion is not a factor in the grafting reaction. By comparison, the p-Me-TFS solution grafting samples exhibited significantly lower percentage grafting as compared to the microemulsion samples.

The present process provides for the preparation of graft copolymers employing fluorostyrenic monomers that is straightforward and makes efficient use of the monomers. The ability to use lower concentrations of monomer than is currently employed in solution graft polymerization of fluorostyrenic monomers, for example, while achieved comparable or superior graft polymerization rates, allows for considerable cost savings, particularly in high-volume, continuous production.

Further, the use of microemulsions in graft polymerization reactions may have advantages compared to emulsions. As indicated in Table 1, emulsions can be unstable, and this can lead to agglomeration of the suspended droplets and phase separation. In turn, phase separation can produce a heterogeneous distribution of monomer in a static monomer bath, which may adversely affect the graft polymerization reaction over time. This problem can be ameliorated by agitating the monomer bath to maintain a homogeneous emulsion, but this requires additional equipment and input of energy to the process. Since microemulsions are typically stable and do not exhibit significant phase separation, the use of microemulsions may avoid this problem.

Further, microemulsions typically do not require emulsifiers to maintain their stability. The use of emulsifiers in emulsions tends to complicate downstream processing steps. In particular, washing steps to remove excess reactants from the graft copolymer can be complicated because solvents employed to wash dimers and excess monomer from the graft copolymer typically do not remove emulsifiers. Where the presence of emulsifier in the final product is undesirable, more additional and/or more vigorous washing steps are usually required. Therefore, the use of microemulsions may eliminate this additional washing step and thereby further simplify the overall graft polymerization process.

The graft copolymers made by the present process have utility in applications such as:

1. ion exchange membranes for electrochemical fuel cell applications;
2. proton exchange membranes in water electrolysis, which involves a reverse chemical reaction to that employed in hydrogen/oxygen electrochemical fuel cells;
3. membranes in filtration and ultrafiltration applications;
4. membranes i chloralkali electrolysis, which typically involves the electrolysis of a brine solution to produce chlorine and sodium hydroxide, with hydrogen as a by-product;
5. electrode separators in conventional batteries, provided the membrane has the requisite chemical inertness and high electrical conductivity;
6. ion-selective electrodes, particularly those used for the potentiometric determination of a specific ion such as $Ca^{2+}$, $Na^+$, $K^+$ and like ions;
7. sensor materials for humidity sensors based on ion exchange membranes, as the electrical conductivity of an ion exchange membrane varies with humidity;
8. ion exchange materials for separations by ion exchange chromatography—typical such applications are deionization and desalination of water, ion separations, removal of interfering ionic species, and separation and purification of biomolecules;
9. ion exchange membranes employed in analytical preconcentration techniques (e.g., Donnan Dialysis);

10. ion exchange membranes in electrodialysis, in which membranes are employed to separate components of an ionic solution under the driving force of an electrical current—industrial applications include desalination of brackish water, preparation of boiler feed make-up and chemical process water, de-ashing of sugar solutions, deacidification of citrus juices, separation of amino acids, and the like;

11. membranes in dialysis applications, in which solutes diffuse from one side of the membrane (the feed side) to the other side according to their concentration gradient—applications include haemodialysis and the removal of alcohol from beer;

12. membranes in gas separation (gas permeation) and pervaporation (liquid permeation) techniques; and 13. bipolar membranes employed in water splitting and subsequently in the recovery of acids and bases from wastewater solutions.

All of the above U.S. patents, U.S. patent application publications, U.S. patent applications, foreign patents, foreign patent applications and non-patent publications referred to in this specification and/or listed in the Application Data Sheet, are incorporated herein by reference in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A process for preparing a graft copolymer, the process comprising:
   exposing a polymeric base material to a dose of ionizing radiation; and
   contacting the irradiated base material with a microemulsion, the microemulsion comprising
   at least one fluorostyrenic monomer, wherein the amount of monomer in the microemulsion is less than or equal to 30% by weight,
   water, and
   a solvent that is at least partially miscible in water.

2. The process of claim 1 wherein the base material is exposed to the dose of ionizing radiation in an inert atmosphere.

3. The process of claim 1 wherein the base material comprises a polymer selected from the group consisting of polyvinylidene fluoride, poly(tetrafluoroethylene-co-perfluorovinylether), poly(tetrafluoroethylene-co-hexafluoropropylene), poly(ethylene-co-chlorotrifluoroethylene), polyethylene, polypropylene, poly(ethylene-co-tetrafluoroethylene), poly(vinylidene fluoride-co-hexafluoropropylene), poly(vinylidene fluoride-co-chlorotrifluoroethylene), and polytetrafluoroethylene.

4. The process of claim 1 wherein the base material comprises polyvinylidene fluoride.

5. The process of claim 1 wherein the base material comprises poly(ethylene-co-chlorotrifluoroethylene).

6. The process of claim 1 wherein the base material comprises ultra-high molecular weight polyethylene.

7. The process of claim 1 wherein the base material comprises a dense or porous film.

8. The process of claim 1 wherein the dose of ionizing radiation is in the range of about 1 Mrad to about 100 Mrad.

9. The process of claim 1 wherein the dose of ionizing radiation is in the range of about 20 Mrad to about 60 Mrad.

10. The process of claim 1 wherein the at least one fluorostyrenic monomer comprises a perfluorinated monomer.

11. The process of claim 1 wherein the fluorostyrenic monomer comprises a substituted $\alpha,\beta,\beta$-trifluorostyrene.

12. The process of claim 1 wherein the fluorostyrenic monomer is selected from the group consisting of methyl-$\alpha,\beta,\beta$-trifluorostyrenes, methoxy-$\alpha,\beta,\beta$-trifluorostyrenes, thiomethyl-$\alpha,\beta,\beta$-trifluorostyrenes phenyl-$\alpha,\beta,\beta$-trifluorostyrenes, and mixtures thereof.

13. The process of claim 1 wherein the fluorostyrenic monomer comprises para-methyl-$\alpha,\beta,\beta$-trifluorostrene.

14. The process of claim 1 wherein the fluorostyrenic monomer is selected from the group consisting of substituted and unsubstituted $\alpha$-fluorostyrenes, $\alpha,\beta$-difluorostyrenes, and $\alpha,\beta,\beta$-trifluorostyrenes, and mixtures thereof.

15. The process of claim 1 wherein the at least one fluorostyrenic monomer comprises a trifluoronaphthyl monomer.

16. The process of claim 1 wherein the microemulsion further comprises at least one monomer selected from the group consisting of styrene, $\alpha$-methylstyrene and vinyl phosphonic acid.

17. The process of claim 1 wherein the solvent is selected from the group consisting of tert-butanol, isopropanol, 1-propanol, ethanol, methanol, and mixtures thereof.

18. The process of claim 1 wherein the solvent comprises 1-propanol.

19. The process of claim 1 wherein the solvent comprises a water-miscible ether or ketone.

20. The process of claim 1 wherein the solvent comprises N-alkylpyrrolidone.

21. The process of claim 1 wherein the microemulsion further comprises an inhibitor.

22. The process of claim 1 wherein the irradiated base material is contacted with the microemulsion at a temperature of about 20° C. to about 100° C.

23. The process of claim 1 wherein the irradiated base material is contacted with the microemulsion at a temperature of about 50° C. to about 80° C.

24. The process of claim 1 wherein the irradiated base material is immersed in the microemulsion.

25. The process of claim 1 wherein the irradiated base material is sprayed with the microemulsion.

26. The process of claim 1 wherein the amount of monomer in the microemulsion is in the range of 5% to 30% by weight.

27. The process of claim 1 wherein the amount of monomer in the microemulsion is less than or equal to 10% by weight.

28. The process of claim 1, further comprising introducing ion exchange functionality into the graft copolymer.

29. The process of claim 1, further comprising treating the graft copolymer by a reaction selected from the group consisting of halomethylation, sulfonation, phosphonation, amination, carboxylation, hydroxylation and nitration.

30. The process of claim 1, further comprising sulfonating or phosphonating the graft copolymer.

31. The process of claim 1 wherein the base material comprises a porous film.

32. The process of claim 31 wherein the graft copolymer is a porous membrane, the process further comprising densifying the membrane.

33. The process of claim 32 wherein densifying the membrane comprises collapsing the porosity thereof.

34. The process of claim 33 wherein the porosity is collapsed by applying heat and pressure to the membrane.

35. The process of claim 34 wherein the membrane is heated to at least the melt flow temperature of the base material.

36. The process of claim 31, further comprising introducing ion exchange functionality into the membrane.

37. The process of claim 31, further comprising sulfonating or phosphonating the membrane.

38. The process of claim 31, further comprising sulfonating the membrane.

39. The process of claim 38 wherein the step of sulfonating the membrane precedes the densifying step.

40. The process of claim 38, further comprising converting at least a portion of sulfonate groups in the membrane to sulfonate salts before the densifying step.

41. The process of 38 wherein the membrane is sulfonated by swelling the membrane in a halogenated solvent and exposing it to sulfur trioxide vapor.

42. The process of claim 38 wherein the membrane is sulfonated by exposing it to chlorosulfonic acid, introducing a sulfonyl halide functionality into the membrane, and hydrolyzing the sulfonyl halide functionality.

43. The process of claim 42 wherein the step of introducing the sulfonyl halide functionality into the membrane occurs before the densifying step, and the step of hydrolyzing the sulfonyl halide functionality occurs after the densifying step.

44. The process of claim 1, further comprising forming the graft copolymer into a membrane.

45. A process for preparing a graft copolymer, the process comprising:

exposing a polymeric base material to a dose of ionizing radiation; and contacting the irradiated base material with a microemulsion, the microemulsion comprising at least one fluorostyrenic monomer, a first liquid phase in which the monomer is not soluble, and a second liquid phase that is at least partially miscible in the first liquid phase and dissolves or is miscible with the monomer, wherein the first and second liquid phases are substantially unreactive towards graft polymerization under process conditions.

* * * * *